(12) United States Patent
Scolari (10) Patent No.: US 9,228,792 B2
(45) Date of Patent: Jan. 5, 2016

(54) FLUID DELIVERY SYSTEM FOR PERSONAL MOBILITY DEVICES

(76) Inventor: Nathan A. Scolari, Greenville, SC (US)

(*) Notice: Subject to any disclaimer, the term of this patent is extended or adjusted under 35 U.S.C. 154(b) by 699 days.

(21) Appl. No.: 13/365,124

(22) Filed: Feb. 2, 2012

(65) Prior Publication Data

US 2012/0193446 A1    Aug. 2, 2012

Related U.S. Application Data

(60) Provisional application No. 61/502,369, filed on Jun. 29, 2011, provisional application No. 61/438,700, filed on Feb. 2, 2011, provisional application No. 61/438,716, filed on Feb. 2, 2011.

(51) Int. Cl.
| | | |
|---|---|---|
| *B62J 99/00* | (2009.01) | |
| *F41B 9/00* | (2006.01) | |
| *B62K 3/00* | (2006.01) | |
| *B05B 9/06* | (2006.01) | |

(52) U.S. Cl.
CPC ............ *F41B 9/0087* (2013.01); *B05B 9/06* (2013.01); *B62J 99/00* (2013.01); *B62K 3/002* (2013.01); *F41B 9/0059* (2013.01); *F41B 9/0081* (2013.01); *B62J 2099/0086* (2013.01)

(58) Field of Classification Search
CPC ......... E01H 3/02; A63H 33/28; F41B 9/0087; F41B 9/0059; F41B 9/0081; B62J 2099/0086; B62J 99/00; B05B 9/06; B62K 3/002
USPC ............................ 239/146, 147, 172, 176, 722
See application file for complete search history.

(56) References Cited

U.S. PATENT DOCUMENTS

| | | | |
|---|---|---|---|
| 1,395,497 A | 11/1921 | Huseman | |
| 1,516,105 A | 3/1923 | Kinoshita | |
| 1,832,018 A | 12/1925 | Gossard | |
| 3,295,248 A | 1/1967 | Knerr et al. | |
| 3,861,076 A | 1/1975 | Starr | |
| 4,214,674 A | 7/1980 | Jones et al. | |
| 4,591,071 A | 5/1986 | Johnson | |
| 4,743,030 A | 5/1988 | Auer et al. | |
| 4,775,348 A | 10/1988 | Collins | |
| 4,821,832 A | 4/1989 | Patmont | |
| 4,854,480 A | 8/1989 | Shindo | |
| 5,074,437 A | 12/1991 | D'Andrade et al. | |
| 5,158,218 A * | 10/1992 | Wery | 222/610 |
| 5,180,108 A * | 1/1993 | Miyamoto | 239/172 |
| 5,645,404 A * | 7/1997 | Zelenak | 417/1 |
| 5,851,017 A * | 12/1998 | Eden | 280/201 |
| 6,145,695 A * | 11/2000 | Garrigues | 220/705 |
| 6,200,184 B1 | 3/2001 | Rich et al. | |
| 6,450,851 B1 | 9/2002 | Rehkemper et al. | |
| 6,722,679 B2 * | 4/2004 | Englert | 280/288.4 |
| 6,953,376 B1 * | 10/2005 | Kim et al. | 446/15 |

FOREIGN PATENT DOCUMENTS

GB    2470562 A  * 12/2010

* cited by examiner

*Primary Examiner* — Justin Jonaitis
(74) *Attorney, Agent, or Firm* — McNair Law Firm, P.A.; Douglas W. Kim (57) ABSTRACT

This invention is a scooter manufactured in combination with a water cannon or a scooter accessory comprising: a scooter having a platform, standard, and handle; a fluid reservoir carried by said scooter in fluid communications with an actuator; a nozzle in fluid communications with said reservoir and carried by said handle so that fluid contained in said reservoir is forced through said nozzle when said actuator is activated. The nozzle can rotate without moving the handle and the actuator can be activated by the rider's hand or foot and be manual or motorized.

20 Claims, 14 Drawing Sheets

FLUID DELIVERY SYSTEM FOR PERSONAL MOBILITY DEVICES

CLAIM OF PRIORITY

This application claims priority on U.S. Provisional Patent Applications 61/502,369 (filed Jun. 29, 2011); 61/438,700 (filed Feb. 2, 2011); and 61/438,716 (filed Feb. 2, 2011).

BACKGROUND OF THE INVENTION

1. Field of the Invention

This invention is directed to an amusement device that squirts water from a personal mobility device platform such as a scooter or skateboard.

2. Description of Related Art

Water guns and bubble makers have been around for decades and now include manual pump type water guns, electric water guns, back mounted water guns, and the popular "Super Soaker". Examples of water guns and their variations can be found in U.S. Pat. Nos. 4,214,674; 4,591,071; 4,743,030; 4,854,480; and 5,074,437. Examples of bubble makers and their variations can be found in U.S. Pat. Nos. 3,295,248; 3,861,076; 4,775,348; 6,200,184; 6,450,851 and 6,953,376.

Scooters also have been around for decades with some of the first patents directed to scooters beginning in the early 1900's. For example, U.S. Pat. No. 1,395,4978 is directed to a platform having a plurality of wheels that can be ridden by an individual. U.S. Pat. No. 1,516,105 is directed to a platform having an upright handle with three wheels. U.S. Pat. No. 1,832,018 is directed to a motorized scooter including an upright handle bar, riding platform, and steering bar. U.S. Pat. No. 4,821,832 is directed to a motor scooter having a foldable handle and a friction drive system.

When riding a scooter and using a water gun, there are challenges, specifically, one hand is needed for the water gun and the other for driving the scooter. Obviously, there are safety issues concerning occupying one hand and the other hand being dedicated to holding and manipulating the water gun.

It would be advantageous to provide for the ability to squirt water while riding a platform without requiring the elimination of one hand from the driving process of the scooter.

Further, it would be advantageous to provide for a system that can squirt water without requiring the hands of the rider to be removed from the scooter nor require the handle of the scooter to be rotated to change the direction of the water.

It would be advantageous to provide for the ability to produce bubbles either automatically or electrically while riding a skateboard, scooter or other personal mobility device without requiring the rider to use his/her hands to turn on or off the bubble maker while riding the skateboard.

It would be advantageous to provide for the ability to produce bubbles either automatically or electrically while riding a skateboard, scooter or other personal mobility device having a fluid reservoir integrated into the platform of the mobility device.

SUMMARY OF THE INVENTION

The objectives of this invention are accomplished by providing a system for providing a scooter manufactured in combination with a water cannon comprising: a scooter having a platform, standard and handle; a fluid reservoir carried by said scooter in fluid communications with an actuator; a nozzle in fluid communications with said reservoir and carried by said handle so that fluid contained in said reservoir is forced through said nozzle when said actuator is activated. The nozzle can rotate without moving the handle and the actuator can be activated by the rider's hand or foot and be manual or motorized.

DESCRIPTION OF THE INVENTION

Figure 1A:
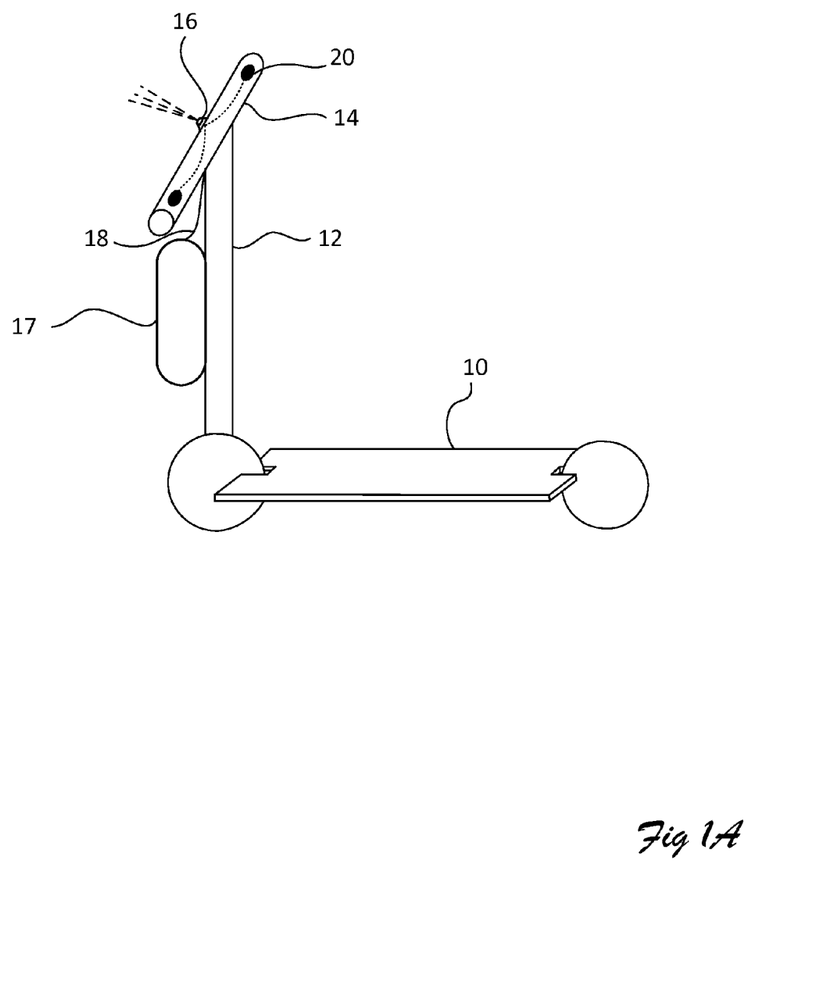
FIGS. 1A through 1C are perspective views of the invention.
Figure 1B:
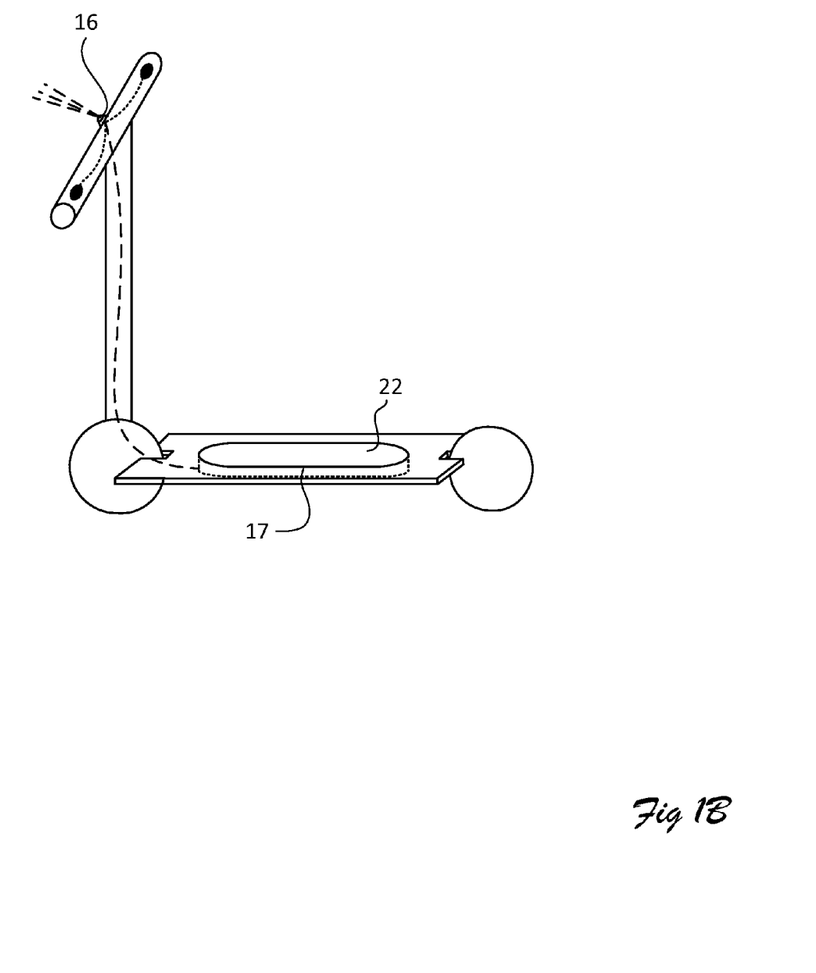
Figure 1C:
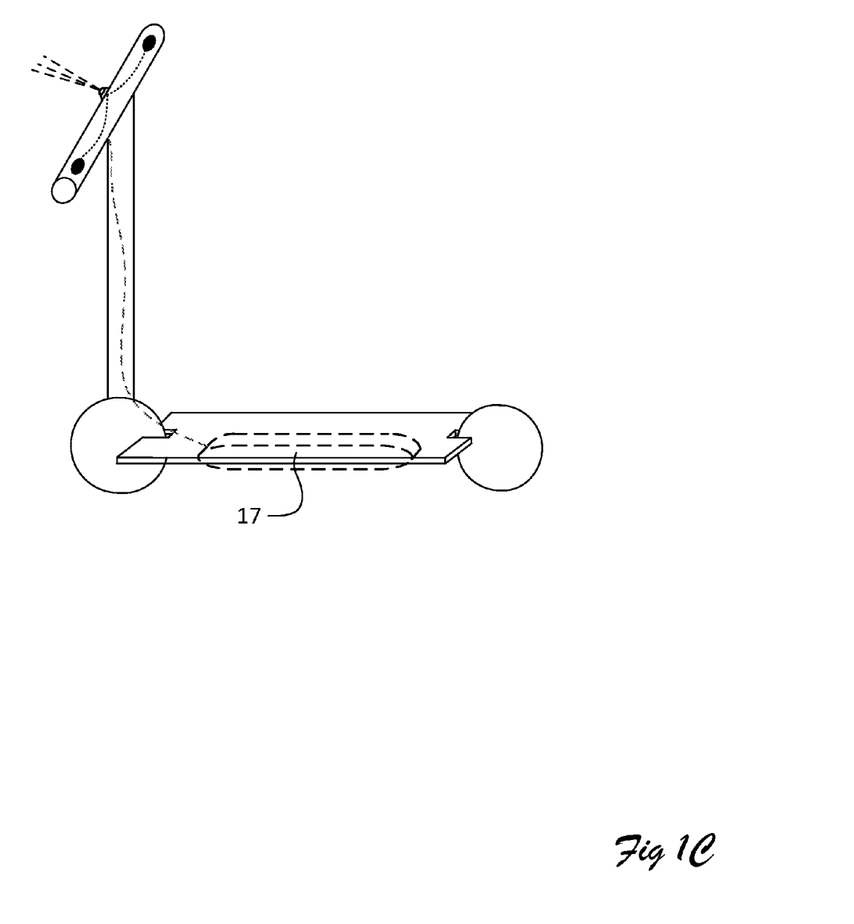

This invention is directed to a water cannon that can be integrated into a scooter or attached to a scooter as an aftermarket accessory. Referring to FIG. 1, scooter 10 includes a standard 12 and a handle bar 14. A fluid reservoir 17 is carried by the scooter and in one embodiment, carried by standard 12. Fluid is transferred to a nozzle 16 through hose 18. Actuators 20 are used to pump fluid or to activate a pump for pumping fluid from the reservoir to the nozzle. In one embodiment, as shown in FIG. 1B, the fluid reservoir is attached to or integrated into the platform that supports the rider. The reservoir can have one portion 22 that is transparent so that the fluid level can be observed by the rider by looking at the reservoir through the platform. In another embodiment, as shown in FIG. 1C, the fluid reservoir is attached under the platform so that it is out of the way and does not interfere with riding the scooter. There can be one or more reservoirs included in the scooter. For example, there can be a standard mounted reservoir for a nozzle mounted on the handle and a platform mounted reservoir for a rearward facing nozzle mounted on the platform.

Figure 2A:
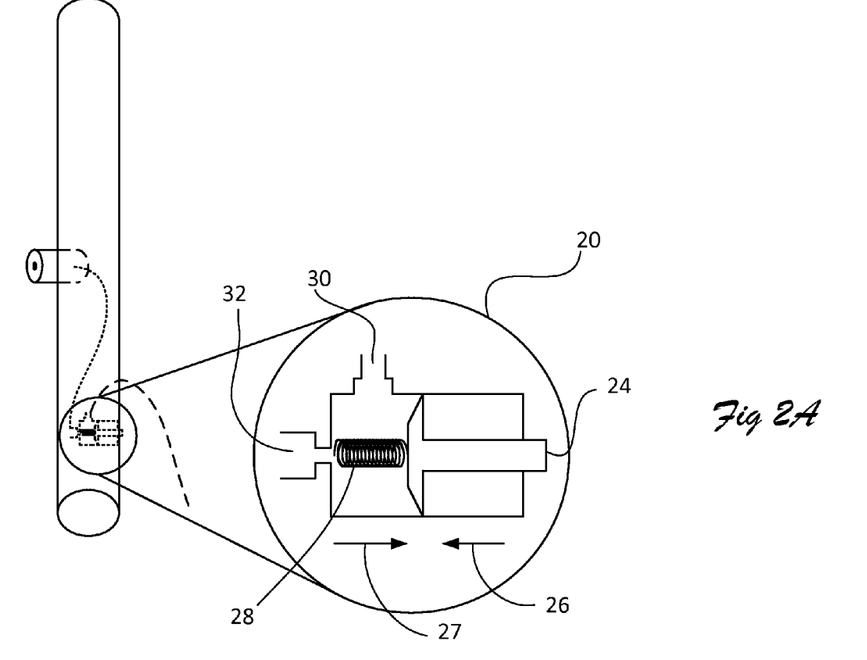
FIGS. 2A through 2D are schematics of portions of the invention.

Referring to FIG. 2A, one pump assembly for transporting fluid from the reservoir to the nozzle is shown. One embodiment of actuator 20 is shown having a button 24 that can be pressed in a direction shown as 26. A spring 28 biases the button in a direction 27 so that the button will return to its original position after being depressed. The actuator includes opening 30 which is connected to the reservoir and opening 32 is connected to the nozzle. When the actuator is activated, fluid will travel from the reservoir to the nozzle.

Figure 2B:
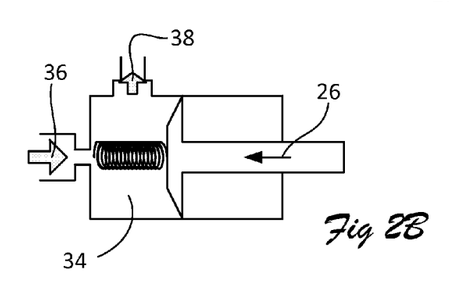
Figure 2C:
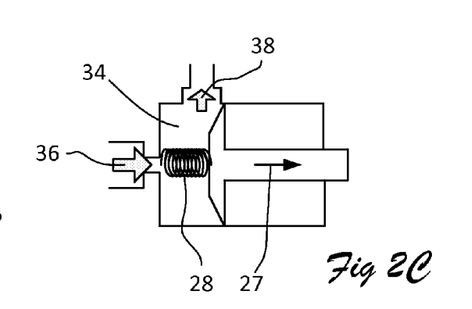

In operation, and referring to FIG. 2B, the button is pressed and travels in direction 26. This creates pressure in a cavity 34. In reaction to the pressure, valve 36 opens and fluid is forced from the cavity outwards toward the nozzle through opening 32. The next step, as shown in FIG. 2C, spring 28 forces the button in a direction 27. This creates a vacuum in cavity 34 and forces valve 36 to close and valve 38 opens. This allows fluid to be drawn into the cavity from the reservoir to fill the cavity so that it can be forced to the nozzle when the button is subsequently pressed.

Figure 2D:
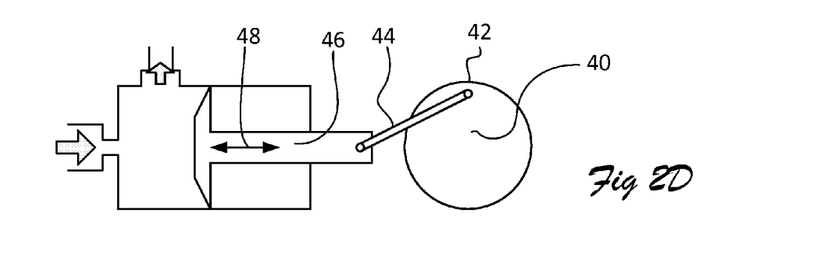

In one embodiment, shown in FIG. 2D, the actuator can be operated through a motorized assembly 40. Motorized assembly can include a wheel 42 and arm 44. When the wheel rotates, the combination wheel and arm cause a plunger 46 to move in a direction shown as 48, creating pressure in the cavity and creates a vacuum in the cavity to force fluid through the nozzle and draw fluid from the reservoir.

Figure 3A:
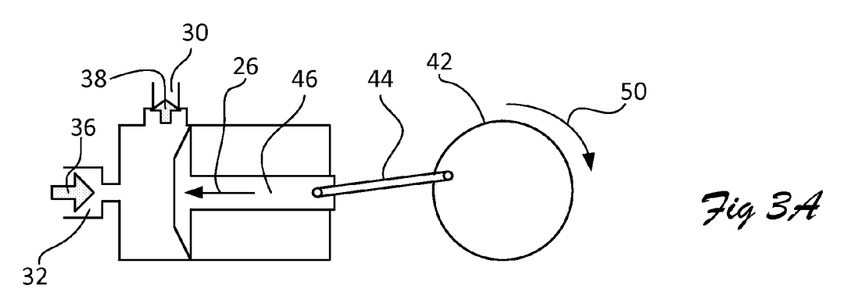
FIGS. 3A through 3C are schematics of portions of the invention.
Figure 3B:
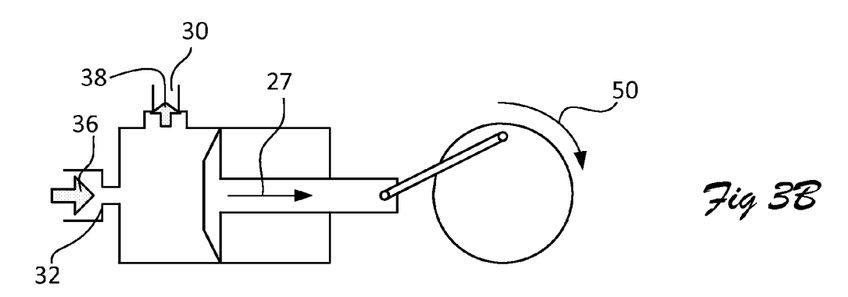
Figure 3C:
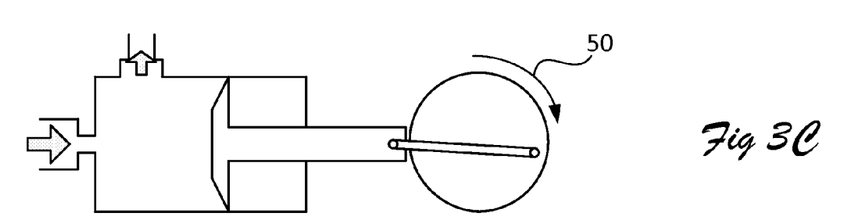

Referring to FIG. 3A, plunger 46 is forced in a direction 26 by the wheel and the arm when the wheel is turning in a direction shown as 50. Valve 36 is forced open by pressure created in the cavity and valve 38 is forced closed. Fluid is forced through opening 32 and through the nozzle. In FIG. 3B, the plunger is moved in direction shown as 27 creating a vacuum in the cavity. Valve 38 opens and valve 36 closes so that the vacuum draws water into the cavity from the reservoir. FIG. 3C shows the cycle beginning to repeat.

Figure 4A:
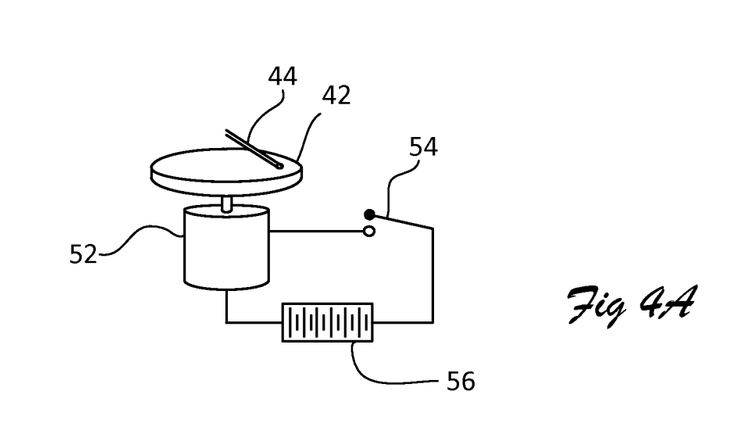
FIGS. 4A through 4E are perspective views of components of the invention.

Referring to FIG. 4A, wheel 42 and arm 44 can be driven by a motor 52, such as an electric motor, connected to a switch 54 and power supply 56. When the switch is closed, the electric motor causes the wheel to rotate resulting in fluid being drawn from the fluid reservoir and forced out through the nozzle. In one embodiment, the switch 54 can be closed by a remote device that is wirelessly connected to the motor and its electrical circuit. When the wireless device is used to close the switch 54, the motor is actuated, thus causing the wheel 50 and arm 44 to move the plunger and directing fluid to the nozzle as described above. It should be understood that this invention is not limited to a single nozzle or that the nozzle be mounted only on the handles. Multiple nozzles can be used and nozzles can exist on the front, side or rear of a scooter. For example, a rear mounted nozzle can be positioned near the rear wheel and aimed to spray fluid upwards into a target that is positioned behind and above the rear wheel.

Figure 4B:
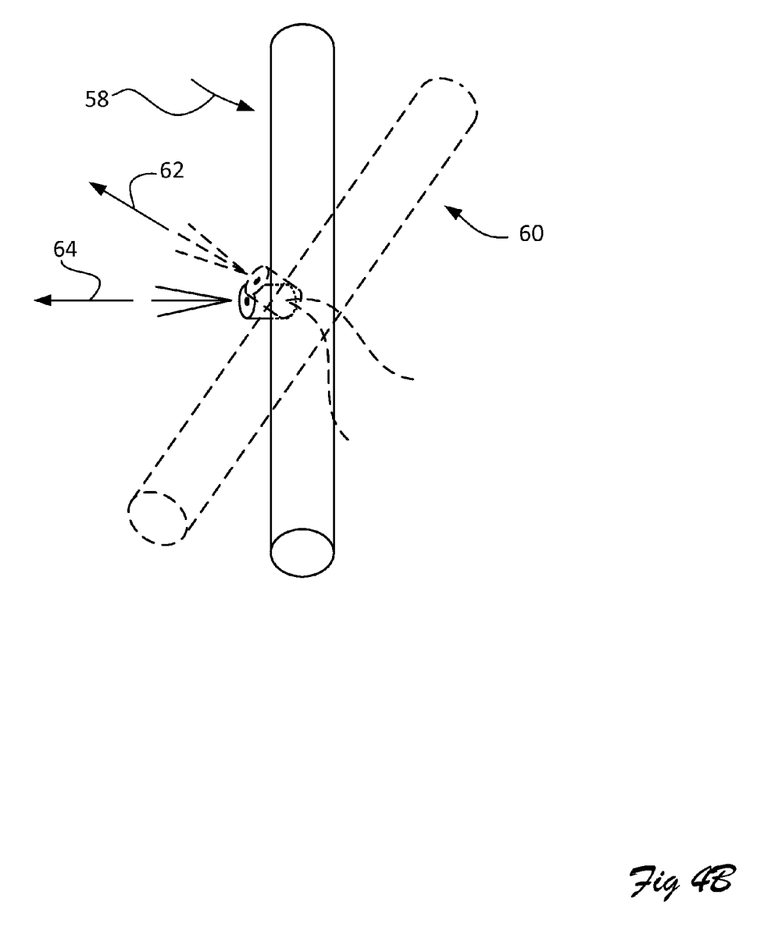

Referring to FIG. 4B, a nozzle attached to a handle is shown. The disadvantages with this design are that the handle bar needs to be turned from position 58 to position 60 so that the nozzle will spray in a direction shown as 62 from its original direction 64. This requires that the direction of the scooter be altered simply to change the direction of the spray of the nozzle.

Figure 4C:
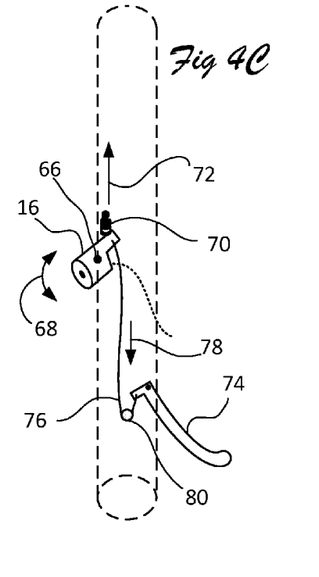
Figure 4D:
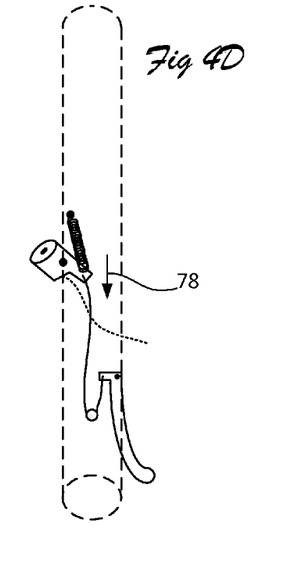
Figure 4E:
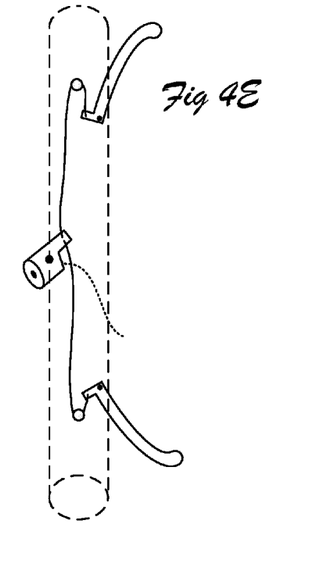

In FIG. 4C, nozzle 16 is pivotally connected to the handle through pivot 66, allowing the nozzle to rotate in a direction shown as 68. A spring 70 biases the nozzle in a direction shown as 72 so that, in this embodiment, the nozzle tends to point to the left of the handles. Lever 74, when pressed, causes cable 76 to move in a direction shown as 78. This direction of force is accomplished since the cable is pulled around idler 80. Referring to FIG. 4D, the effect of the lever being pressed is shown. When tension is placed on the cable, the nozzle is pulled in a direction 78 resulting in the nozzle rotating counterclockwise and thereby aiming to the right on the handles. Therefore, the nozzle spray can be aimed without the need to move the handles and interfere with the direction of travel of the scooter. In one embodiment, shown in FIG. 4E, a plurality of levers are connected to the nozzle through cables so that when one lever is pulled, the nozzle rotates and changes the aim of the spray. The levers and nozzle can be arranged so that the right lever moves the nozzle right and the left lever moves the nozzle left, or the directions can be reversed.

Figure 5A:
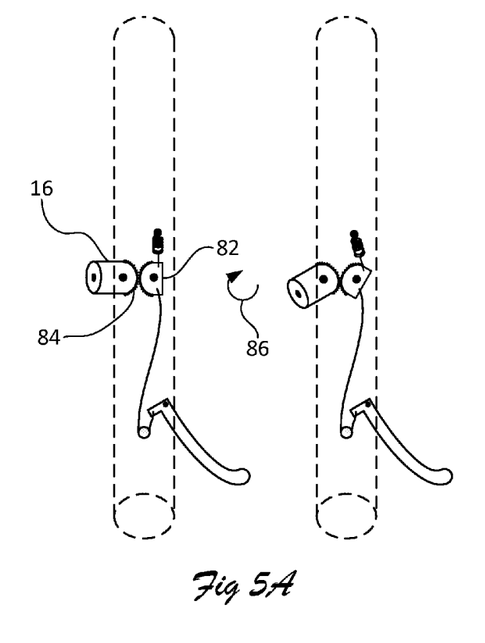
FIGS. 5A through 5B are perspective views of components of the invention.
Figure 5B:
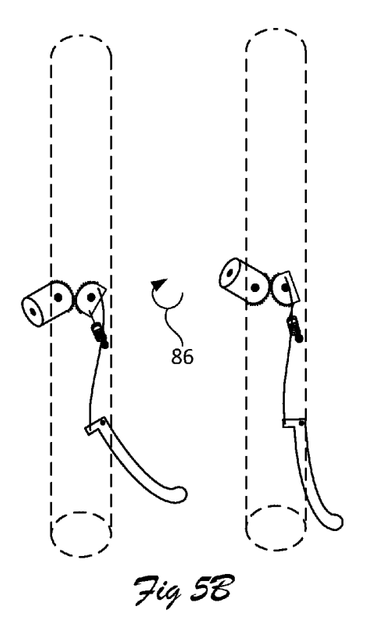

Referring to FIG. 5A, another embodiment is shown wherein a gear is connected to nozzle 16 wherein nozzle 16 includes teeth 84. When the lever connected to the gear through the cable is pulled, the gear rotates in a direction shown as 86 causing the nozzle to rotate in an opposite direction causing the nozzle to aim to the left. When tension on the cable is removed, the spring connected to the gear pulls the gear in a direction opposite that of direction 84 and causing the nozzle to rotate in direction 86 and aim to the right. In FIG. 5B, the idler is not present and the cable causes the gear to rotate in a direction shown as 86 when the lever is pulled by switching the connection points of the cable and spring on the gear. In one embodiment, the direction of the gear rotation in response to the lever being pulled can be reversed.

Figure 6A:
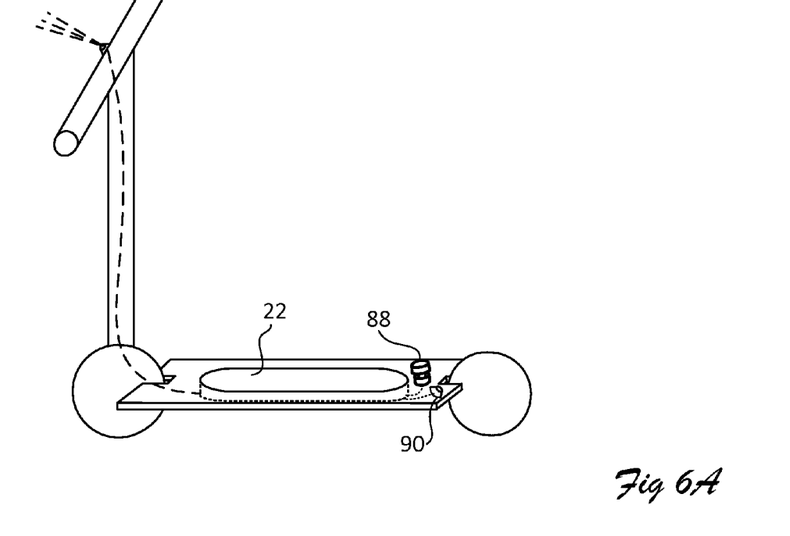
FIGS. 6A and 6B are perspective views of the invention.
Figure 6B:
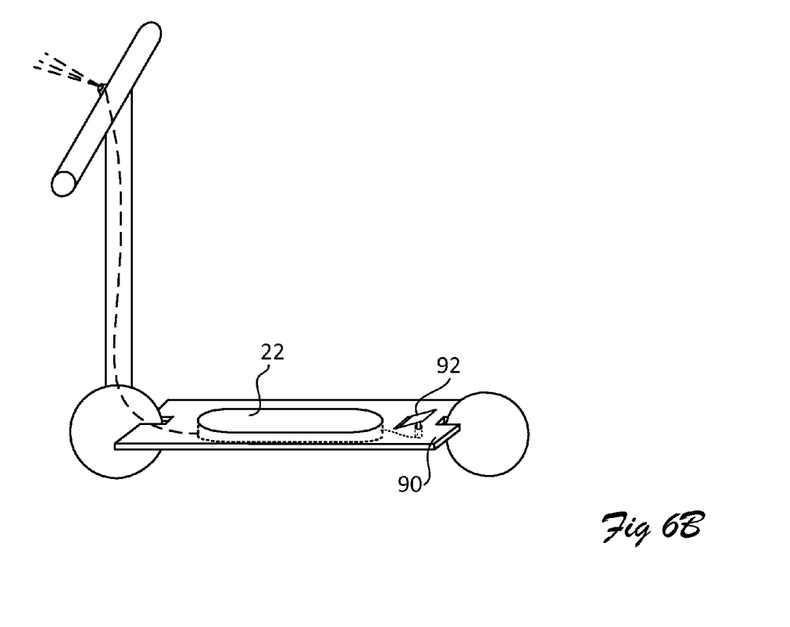

Referring to FIGS. 6A and 6B, another embodiment of the invention is shown. In this embodiment, actuator 88 is carried by the rider's platform and can be activated upon pressure from the rider's foot. The actuator is connected to a manual pump or electric pump which will force fluid from the reservoir to the nozzle. Actuator 88 can force fluid to muzzle 16 carried by the handle or through nozzle 90, or both in combination. In one embodiment, the actuator 92 is a foot pump assembly that forces fluid from the reservoir out though the nozzle. In one embodiment, multiple actuators can activate pumps to force water through multiple nozzles both individually and in combination through a selector which can open and close valves to only allow fluid to travel to certain nozzles.

Figure 7:
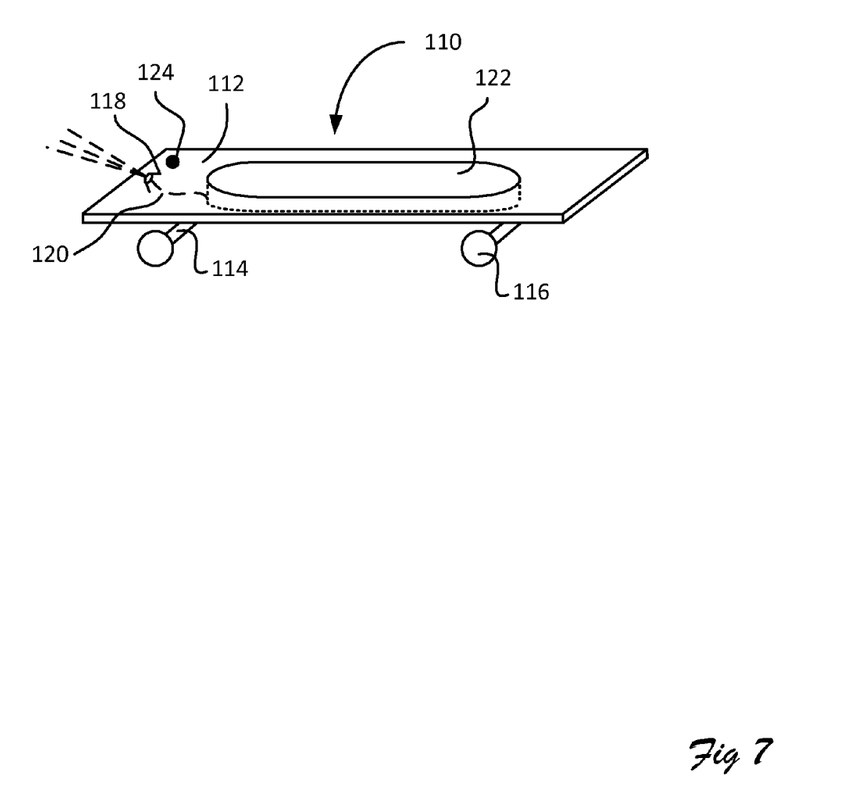
FIG. 7 is a perspective view of the invention.

This invention is also directed to a water cannon that can be integrated into a skateboard or attached to a skateboard as an aftermarket accessory. Referring to FIG. 7, skateboard 110 includes a deck 112, trucks 114, and wheels 116. As is well known in the art, two trucks 114 are carried by the underside of the deck 112 and each set of trucks includes a set of wheels 116. A fluid reservoir 122 is carried by the skateboard and is in fluid communication with the nozzle 118. Fluid is transferred to a nozzle 118 through hose 120. Actuator 124 can be used to cause fluid to be pumped or to activate a pump for pumping fluid from the reservoir 122 through the nozzle 118. In one embodiment, the fluid reservoir 122 is attached to or integrated into the deck 112 that supports the rider.

The reservoir can have one portion 122 that is transparent so that the fluid level can be observed by the rider by looking at the reservoir. The fluid reservoir can be attached under or otherwise to the deck. When attached under the deck, the fluid reservoir it is out of the way and does not interfere with riding the skateboard.

Figure 8:
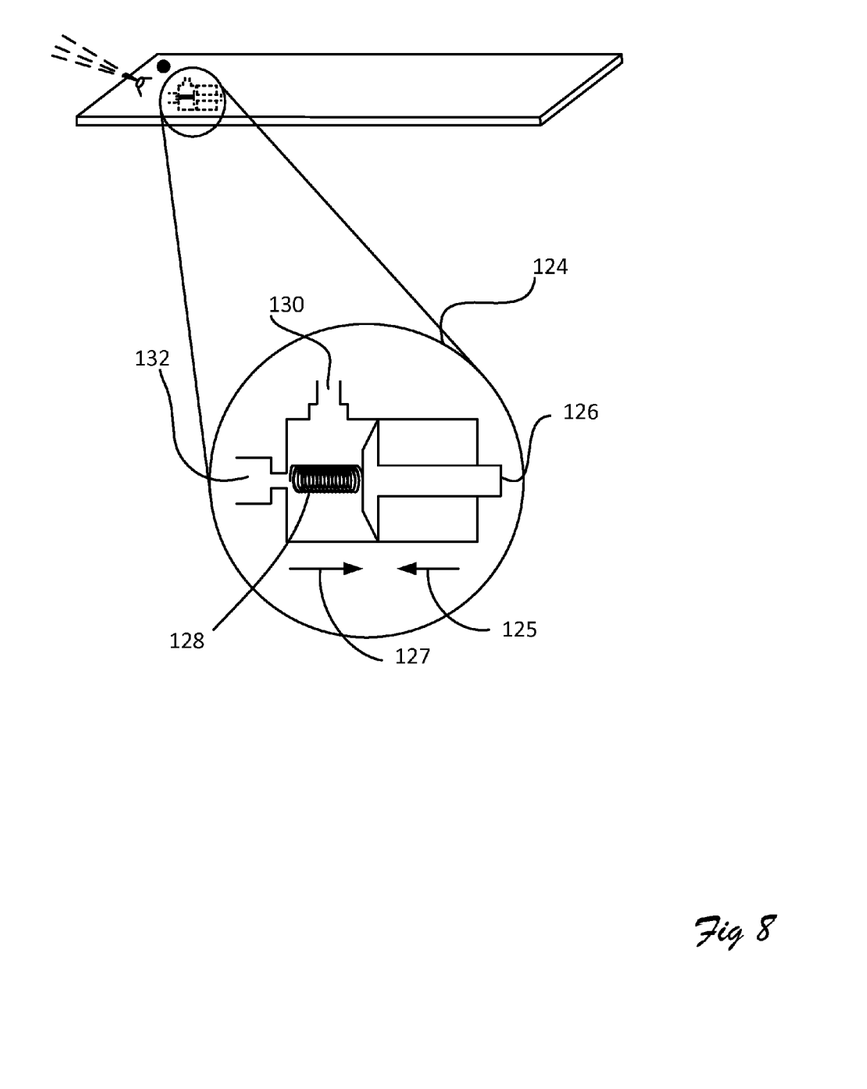
FIG. 8 is a perspective and schematic view of portions of the invention.

Referring to FIG. 8, one pump assembly for transporting fluid from the reservoir to the nozzle is shown. One embodiment of actuator 124 is shown having a button 126 that can be pressed in a direction shown as 125. A spring 128 biases the button in a direction 127 so that the button will return to its original position after being depressed. The actuator includes opening 130 which is connected to the reservoir and opening 132 is connected to the nozzle. When the actuator is activated, fluid will travel from the reservoir to the nozzle.

Multiple nozzles can be used and nozzles can exist on the front, side or rear of a skateboard. For example, a rear mounted nozzle can be positioned near the rear of the deck and aimed to spray fluid upwards into a target that is positioned behind and above the deck.

Figure 9A:
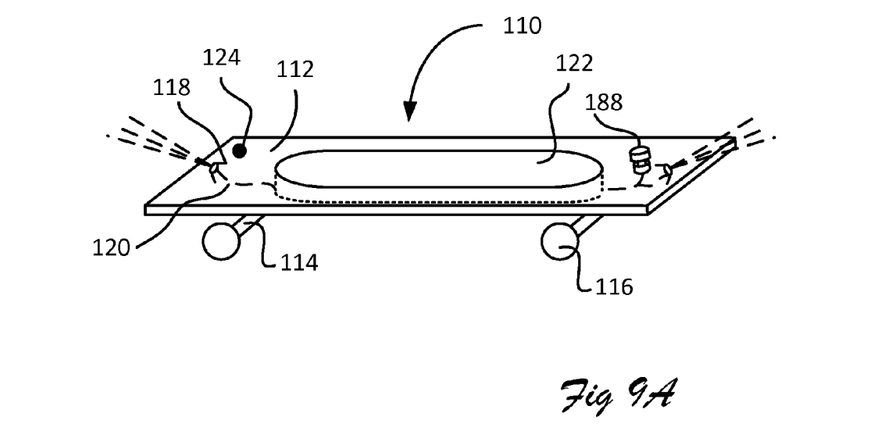
FIGS. 9A and 9C are perspective views of the invention.

Referring to FIG. 9A, another embodiment of the invention is shown. In this embodiment, actuator 188 is carried by the upper portion of the deck and can be activated upon pressure from the rider's foot. The actuator is connected to a manual pump or electric pump which will force fluid from the reservoir to the nozzle. Actuator 188 can force fluid to nozzle 118 carried by the front portion of the deck or through nozzle 190 carried by the rear portion of the deck, or both in combination.

Figure 9B:
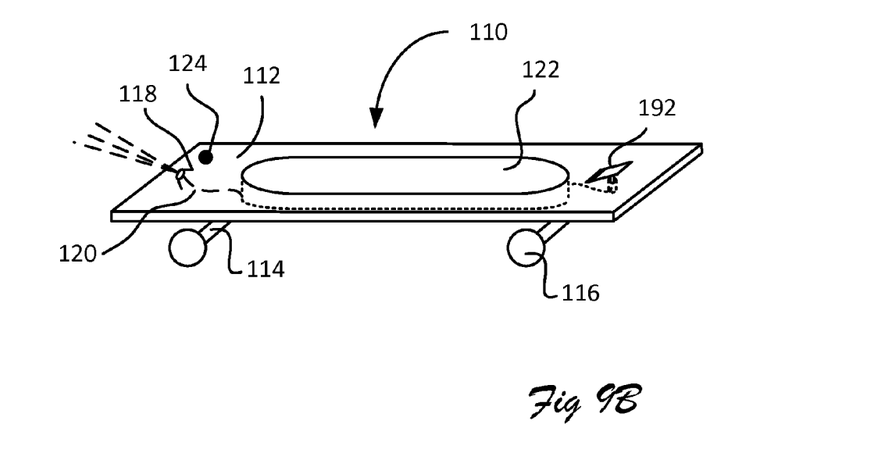

As can be seen in FIG. 9B, in one embodiment, the actuator 192 is a foot pump assembly that forces fluid from the reservoir 122 out though the nozzle 118. In one embodiment, multiple actuators can activate pumps to force water through multiple nozzles, both individually and in combination, through a selector which can open and close valves to only allow fluid to travel to certain nozzles.

Figure 9C:
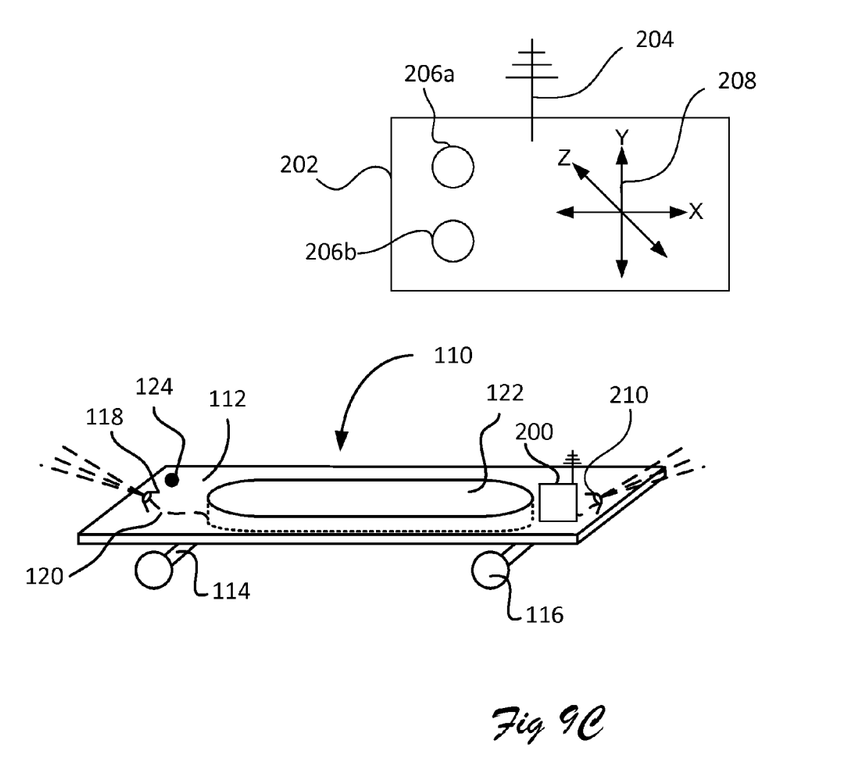

Referring to FIG. 9C, a receiver 200 can be connected to a pump so that when the receiver receives an "on" command, the pump is actuated and fluid is delivered to the nozzle. A transmitter 202 can include an antenna 204, actuation buttons 206a and 206b and at least one accelerometer 208. In operation, the transmitter can send commands to the receiver. If button actuator 206a is depressed, a front nozzle spray command can be transmitted and the front nozzle would deliver fluid. If the button actuator 206b is depressed, a rear nozzle spray command can be transmitted and the rear nozzle would deliver fluid. The directions of the nozzles can be determined by the spatial position of the transmitter. For example, the nozzle can be connected to a position member carried by the skateboard 110 so that the nozzle can be mechanically positioned in a particular direction by the position member. The position member can include gears or a ball and socket assembly for positing the nozzle. By moving the transmitter, the accelerometer can determine the direction of movement of the transmitter and transmit a movement command to the receive which will in turn actuate the positioning member and point the nozzle in the represented direction. Nozzles can be positioned in a 360° range of direction. In one embodiment, the transmitter is integrated into a glove worn by the rider. The glove can include safety features such as durable material for its construction, securing bands, and impact pads.

Fluid that can be delivered by the nozzles can include dyed fluid, or a fluid that interacts with an impregnated material so that when the material is moistened with the fluid, the material indicates that the fluid hit the material.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A personal mobility device having a fluid dispenser;
a planar substantially rectangular platform for supporting a rider standing on the platform;
a fluid reservoir integrated into the platform;
a nozzle pivotably carried by said platform and in fluid communications with said fluid reservoir;
a fluid actuator disposed on the platform and actuated by the rider's foot in communications with said fluid reservoir that, when actuated, delivers fluid from said reservoir to said nozzle; and
a nozzle actuator that, when actuated, positions said nozzle in a particular direction according to said nozzle actuator so that fluid is sprayed from said nozzle in a controllable direction.

2. The apparatus of claim 1 including:
a standard attached to said platform;
a handle attached to said standard wherein said nozzle is pivotably connected to said handle and said fluid actuator and said nozzle actuator are attached to said handle.

3. The apparatus of claim 2 wherein said reservoir is attached to said standard.

4. The apparatus of claim 1 wherein said reservoir extends underneath said platform.

5. The apparatus of claim 1 including a transparent portion included in said reservoir so that the fluid level is visible through said transparent portion.

6. The apparatus of claim 1 wherein said fluid actuator includes an electrically powered pump.

7. The apparatus of claim 1 including a second nozzle carried at the rear of said platform so that fluid forced through said nozzle sprays behind said platform.

8. The apparatus of claim 1 wherein said nozzle actuator includes a lever carried so that, when depressed by the rider's foot, said nozzle rotates from a first direction to a second direction so that said nozzle can be rotated to aim in different directions.

9. The apparatus of claim 8 wherein said fluid actuator activates a motorized assembly which rotates said nozzle.

10. The apparatus of claim 1 wherein said fluid actuator is a foot pedal carried by the rear portion of said platform.

11. The apparatus of claim 1 wherein said fluid is a bubble making solution so that when said fluid is delivered from said nozzle, bubbles are formed.

12. The apparatus of claim 1 wherein said personal mobility device is one from the group consisting of a skateboard and a scooter.

13. The apparatus of claim 1 including:
a receiver carried by said platform and attached to said fluid actuator;
a transmitter in communications with said receiver having button actuators that, when actuated, cause said transmitter to send a command to said receiver so that when said receiver receives a fluid actuation command, said receiver actuates said fluid actuator;
a plurality of accelerometer for determining the spatial orientation of said transmitter;
a set of computer readable instructions included in a computer readable medium in communications with said transmitter for determining spatial movement or said transmitter, associating said spatial movement with a command and transmitting the associated command to said receiver wherein said command is taken from the group consisting of raising the nozzle, lowering the nozzle, rotating the nozzle and actuating the fluid actuator.

14. The apparatus of claim 1 including:
a receiver carried by said platform and attached to said fluid actuator;
a transmitter in communications with said receiver having button actuators that, when actuated, cause said transmitter to send a command to said receiver so that when said receiver receives a fluid actuation command, said receiver actuates said fluid actuator;
a plurality of accelerometer for determining the spatial orientation of said transmitter;
a set of computer readable instructions included in a computer readable medium in communications with said transmitter for determining spatial movement of said transmitter, associating said spatial movement with a command and transmitting the associated command to said receiver wherein said command is taken from the group consisting of raising the nozzle, lowering the nozzle, rotating the nozzle, and actuating the fluid actuator;
a fluid reservoir carried by a scooter in fluid communications with an actuator;
a nozzle in fluid communications with said reservoir and carried by said scooter so that fluid contained in said reservoir is forced through said nozzle when said actuator is activated.

15. The apparatus of claim 1 including:
a rear nozzle attached to a rear portion of said platform and in communications with said reservoir; and,
a rear nozzle actuator that, when actuated by the rider's foot, sprays fluid from said rear nozzle.

16. The apparatus of claim 1 including:
a rear nozzle attached to a rear portion of said platform and in communications with a rear reservoir attached to said platform; and,
a rear nozzle actuator that, when actuated, sprays fluid from said rear nozzle from said rear reservoir.

17. A personal mobility device having a fluid dispenser:
a platform for supporting a rider standing on the platform having a standard and handle;
a fluid reservoir integrated into the platform;
a nozzle pivotably carried by said platform and in fluid communications with said fluid reservoir; and,
a fluid actuator disposed on the platform in communications with said fluid reservoir that, when actuated, delivers fluid from said reservoir to said nozzle.

18. The apparatus of claim 17 including a nozzle actuator that, when actuated, positions said nozzle in a particular direction according to said nozzle actuator so that fluid is sprayed from said nozzle in a controllable direction.

19. The apparatus of claim 1 where in the platform is a deck of a skateboard.

20. The apparatus of claim 1 where in the platform of claim 1 is platform for a scooter.

\* \* \* \* \*